US012682529B2

(12) United States Patent
Grant

(10) Patent No.: US 12,682,529 B2
(45) Date of Patent: *Jul. 14, 2026

(54) VIRTUAL REALITY PRESENTATION OF BODY POSTURES OF AVATARS

(71) Applicant: Linden Research, Inc., San Francisco, CA (US)

(72) Inventor: Jeremiah Arthur Grant, Petaluma, CA (US)

(73) Assignee: Linden Research, Inc., San Francisco, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 17/842,556

(22) Filed: Jun. 16, 2022

(65) Prior Publication Data

US 2022/0309728 A1 Sep. 29, 2022

Related U.S. Application Data

(63) Continuation of application No. 17/322,657, filed on May 17, 2021, now Pat. No. 11,398,067, which is a continuation of application No. 16/561,771, filed on Sep. 5, 2019, now Pat. No. 11,030,788, which is a continuation of application No. 15/461,353, filed on Mar. 16, 2017, now Pat. No. 10,438,393.

(51) Int. Cl.
*G06T 13/40* (2011.01)
*G06F 3/01* (2006.01)

(52) U.S. Cl.
CPC .............. *G06T 13/40* (2013.01); *G06F 3/012* (2013.01); *G06F 3/017* (2013.01)

(58) Field of Classification Search
None
See application file for complete search history.

(56) References Cited

U.S. PATENT DOCUMENTS

| | | | |
|---|---|---|---|
| 5,736,982 A | 4/1998 | Suzuki et al. | |
| 6,806,898 B1 | 10/2004 | Toyama et al. | |
| 7,386,799 B1 | 6/2008 | Clanton et al. | |
| 9,665,170 B1 | 5/2017 | Ross et al. | |
| 10,325,396 B2 | 6/2019 | Grant | |
| 10,438,393 B2 | 10/2019 | Grant | |

(Continued)

OTHER PUBLICATIONS

Colburn, Alex, Michael F. Cohen, and Steven Drucker. "The role of eye gaze in avatar mediated conversational Interfaces." Sketches and Applications, Siggraph'00 (2000). (Year: 2000).

(Continued)

*Primary Examiner* — Jeffrey J Chow
(74) *Attorney, Agent, or Firm* — Greenberg Traurig

(57) ABSTRACT

A computing system and method to implement a three-dimensional virtual reality world with avatar posture animation without user posture tracking devices. A position and orientation of a respective avatar in the virtual reality world is tracked to generate a view of the virtual world for the avatar and to present the avatar to others. In response to input data tracking a position, orientation, and motions of a head of a user of the virtual reality world, the server system uses a posture model to predict, from the input data, a posture of an avatar of the user in the virtual reality world, and computes an animation of the avatar showing the posture of the avatar in the virtual reality world.

13 Claims, 8 Drawing Sheets

(56) References Cited

U.S. PATENT DOCUMENTS

| | | | |
|---|---|---|---|
| 10,489,960 | B2 | 11/2019 | Grant |
| 11,030,788 | B2 | 6/2021 | Grant |
| 11,398,067 | B2 | 7/2022 | Grant |
| 2002/0008716 | A1 | 1/2002 | Colburn et al. |
| 2002/0089506 | A1 | 7/2002 | Templeman |
| 2007/0003915 | A1 | 1/2007 | Templeman |
| 2007/0260984 | A1* | 11/2007 | Marks .................... A63F 13/42 |
| | | | 715/706 |
| 2007/0298866 | A1 | 12/2007 | Gaudiano et al. |
| 2009/0300493 | A1 | 12/2009 | Hamilton, II et al. |
| 2012/0327085 | A1 | 12/2012 | Shuster et al. |
| 2014/0168348 | A1 | 6/2014 | Kubota et al. |
| 2016/0187969 | A1* | 6/2016 | Larsen ............... G02B 27/0093 |
| | | | 345/156 |
| 2016/0260262 | A1* | 9/2016 | Baker .................. A63F 13/213 |
| 2016/0300390 | A1 | 10/2016 | Malafeew |
| 2016/0328876 | A1 | 11/2016 | Tong et al. |
| 2017/0076486 | A1* | 3/2017 | Aizawa ................... G06F 1/163 |
| 2017/0139474 | A1 | 5/2017 | Rochford et al. |
| 2017/0206694 | A1* | 7/2017 | Jiao ...................... G06V 40/174 |
| 2017/0243387 | A1 | 8/2017 | Li et al. |
| 2018/0232928 | A1 | 8/2018 | Grant |
| 2018/0268589 | A1 | 9/2018 | Grant |
| 2019/0188895 | A1* | 6/2019 | Miller, IV ............. G06V 40/20 |
| 2019/0220089 | A1 | 7/2019 | Kakizawa et al. |
| 2019/0244416 | A1 | 8/2019 | Tamaoki et al. |
| 2019/0266776 | A1 | 8/2019 | Grant |
| 2019/0392627 | A1 | 12/2019 | Grant |
| 2020/0098156 | A1 | 3/2020 | Grant |
| 2021/0272344 | A1 | 9/2021 | Grant |
| 2022/0212097 | A1* | 7/2022 | Watanabe ............... G06F 9/453 |

OTHER PUBLICATIONS

Guilbault, Louis-Remi. "Sitting on a chair Animation." YouTube, <https://www.youtube.com/watch?v=7ASxbkREtw0>, Sep. 23, 2014.

Reidsma, Dennis, et al. "Virtual meeting rooms: from observation to simulation." Ai & Society 22.2 (2007): 133-144. (Year: 2007).

Select Screenshots, Video entitled "Sitting on a chair Animation", available at: https://www.youtube.com/watch?v=7 ASxbkREtw0; Published Sep. 2014 by Guilbault.

Itti, Laurent, Nitin Dhavale, and Frederic Pighin. "Realistic avatar eye and head animation using a neurobiological model of visual attention." Applications and Science of Neural Networks, Fuzzy Systems, and Evolutionary Computation VI. vol. 5200. International Society for Optics and Photonics, 2003. (Year: 2003).

* cited by examiner

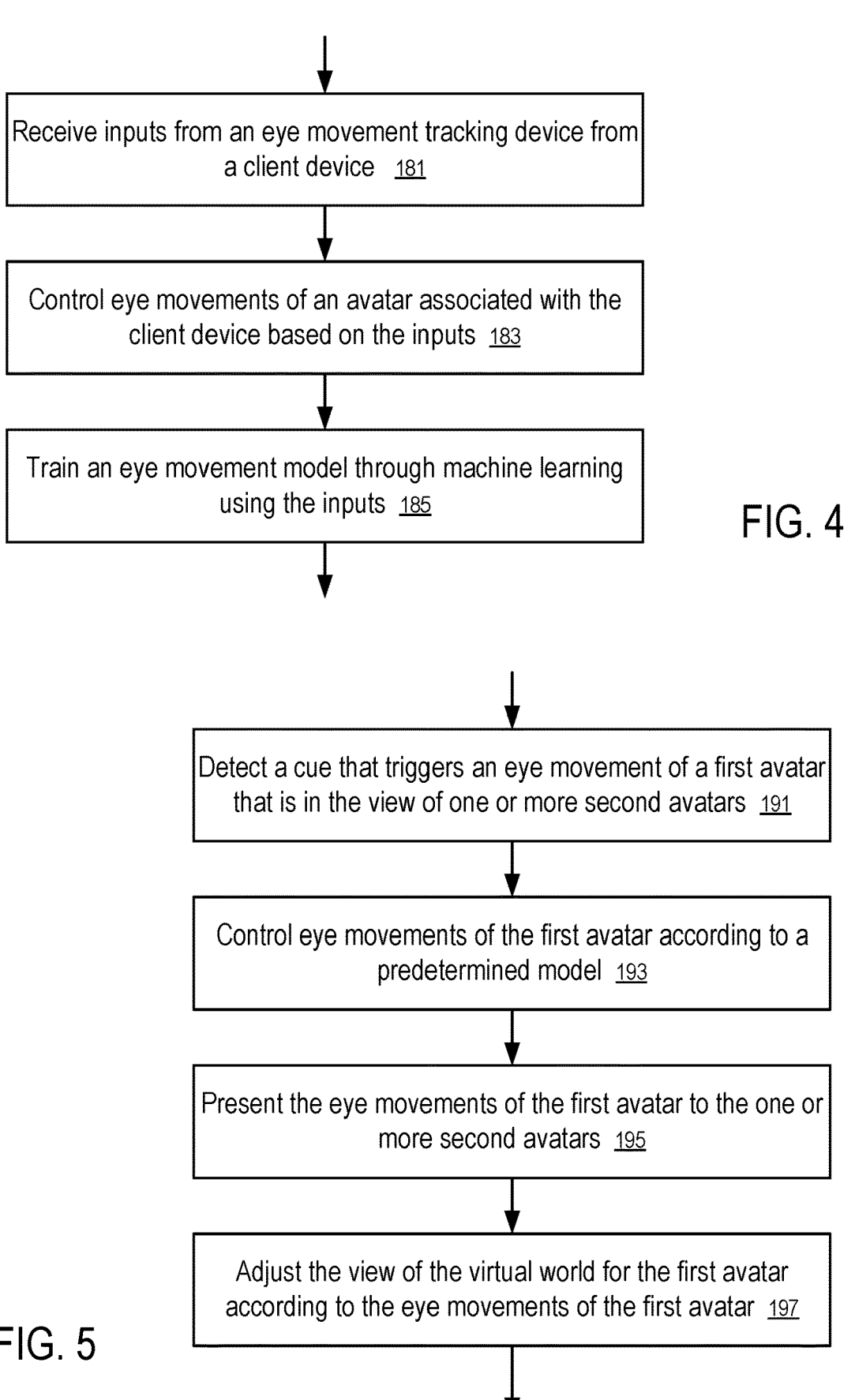

Receive inputs from an eye movement tracking device from a client device 181

Control eye movements of an avatar associated with the client device based on the inputs 183

Train an eye movement model through machine learning using the inputs 185

FIG. 4

Detect a cue that triggers an eye movement of a first avatar that is in the view of one or more second avatars 191

Control eye movements of the first avatar according to a predetermined model 193

Present the eye movements of the first avatar to the one or more second avatars 195

Adjust the view of the virtual world for the first avatar according to the eye movements of the first avatar 197

FIG. 5

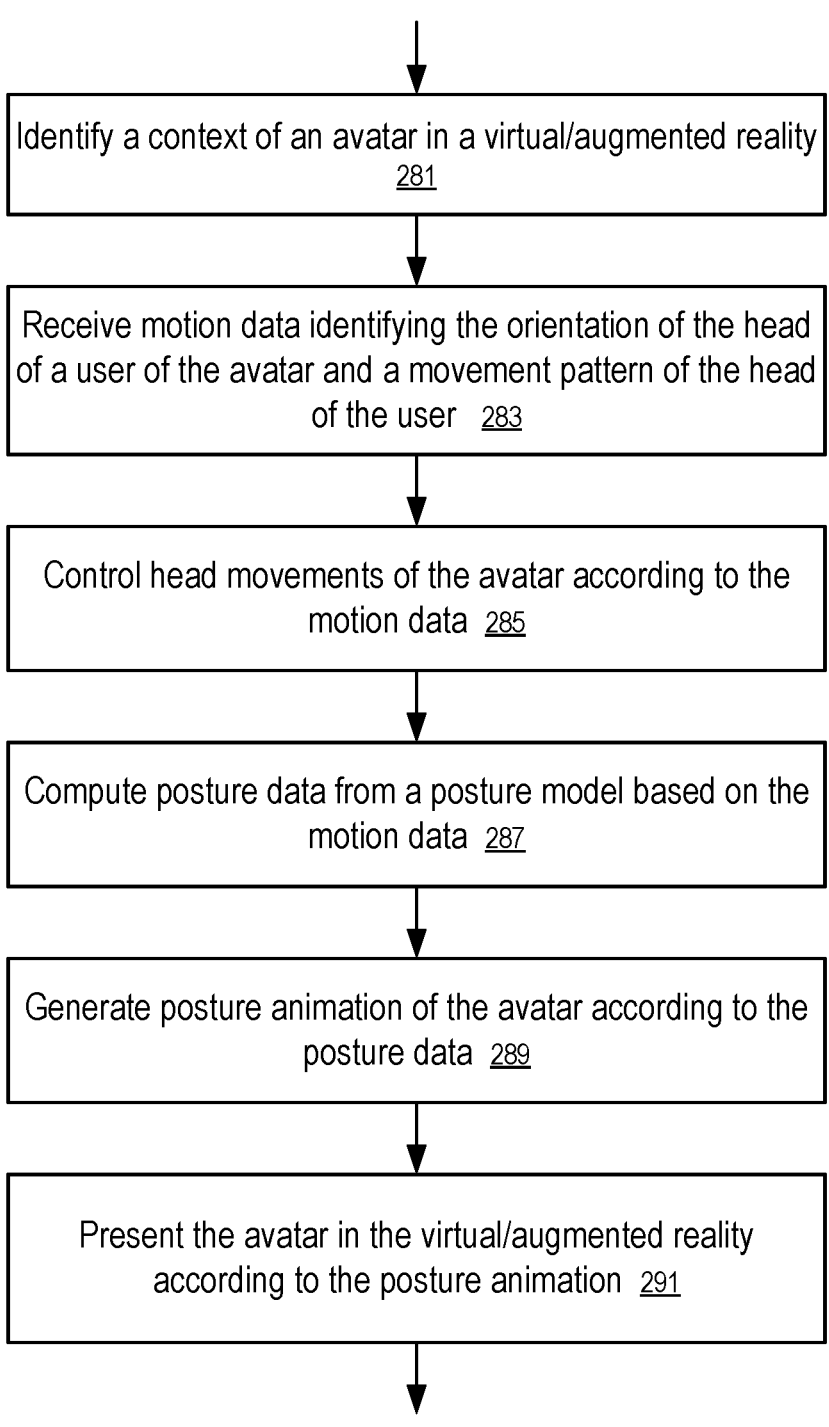

Identify a context of an avatar in a virtual/augmented reality
281

Receive motion data identifying the orientation of the head of a user of the avatar and a movement pattern of the head of the user   283

Control head movements of the avatar according to the motion data   285

Compute posture data from a posture model based on the motion data   287

Generate posture animation of the avatar according to the posture data   289

Present the avatar in the virtual/augmented reality according to the posture animation   291

FIG. 11

VIRTUAL REALITY PRESENTATION OF BODY POSTURES OF AVATARS

RELATED APPLICATIONS

The present application is a continuation application of U.S. patent application Ser. No. 17/322,657, filed May 17, 2021, which is a continuation application of U.S. patent application Ser. No. 16/561,771, filed Sep. 5, 2019, issued as U.S. Pat. No. 11,030,788 on Jun. 8, 2021, which is a continuation application of U.S. patent application Ser. No. 15/461,353, filed Mar. 16, 2017, issued as U.S. Pat. No. 10,438,393 on Oct. 8, 2019, both entitled "Virtual Reality Presentation of Body Postures of Avatars," the entire disclosures of which applications are hereby incorporated herein by reference.

The present application is related to U.S. patent application Ser. No. 15/432,275, filed Feb. 14, 2017, issued as U.S. Pat. No. 10,325,396 on Jun. 18, 2019 and entitled "Virtual Reality Presentation of Eye Movement and Eye Contact", the entire disclosure of which application is hereby incorporated herein by reference.

FIELD OF THE TECHNOLOGY

At least some technologies disclosed herein relate to computer graphics processing and visual display in general and more specifically but not limited to three-dimensional modeling of a virtual world.

BACKGROUND

Computer technologies have developed for the presentation of three-dimensional virtual worlds to users of computing devices.

For example, a virtual world can be hosted on a set of server computers (e.g., secondlife.com). Client programs or viewers can be installed on user computers for connections to the server computers and for user participation in the virtual world. Users of a virtual world can be presented as the residents of the virtual world in the form of avatars. The resident avatars can travel in the three-dimensional virtual world, explore the three-dimensional virtual world, meet other resident avatars for virtual social activities, and communicate with each other via voice, instant messaging, text chart, local chat, and/or group chat. The avatars may build, create, shop and trade virtual objects and services with each other in the three-dimensional virtual world.

Avatars of a virtual world may take various forms, such as human, animal, vegetable, etc. In a virtual world, users may customize various aspects of their avatars and may choose to resemble the users themselves in appearance as they are in the real world. A user may have multiple avatars, but use only one avatar at a time for participation in the virtual world.

In a virtual world, a user of a client program or viewer of the virtual world can use conventional input devices to control the activities of the avatar that represents the user in the virtual world, such as keyboards and pointer control device (e.g., mouse, touch pad, track ball, joystick, and touch screen). The view of the virtual world as currently being seen by the avatar at its current position and orientation can be presented on a display device, such as a computer monitor, a display of a notebook computer, a touch screen of a mobile device.

Virtual reality (VR) headsets have been developed to provide an immersive experience of virtual reality. A virtual reality headset may have a stereoscopic head-mounted display to provide separate images for each eye of a user. A virtual reality headset may also be able to produce stereo sound, and generate user inputs via motion tracking sensors, such as gyroscopes, accelerometers, etc. Some virtual reality headsets also have eye tracking sensors and/or gaming controllers.

Eye tracking involves the measuring the point of the gaze or the motion of an eye of a user relative to the head of the user. For example, the eye position may be extracted from video images for the determination of the point of the gaze and the eye movements relative to the head.

There is a challenge to present movements of various parts of avatars in virtual world, especially when the user devices do not have sufficient capabilities to track the movements of the corresponding movements of users of the avatars (e.g., eye movements, body posture).

BRIEF DESCRIPTION OF THE DRAWINGS

The embodiments are illustrated by way of example and not limitation in the figures of the accompanying drawings in which like references indicate similar elements.

FIG. 4 shows another method to train an eye movement model for virtual reality.

FIG. 5 shows a method to generate visual outputs according to an eye movement model according one embodiment.

FIG. 11 shows a method to present an avatar with posture animation in a virtual/augmented reality.

DETAILED DESCRIPTION

Figure 1:
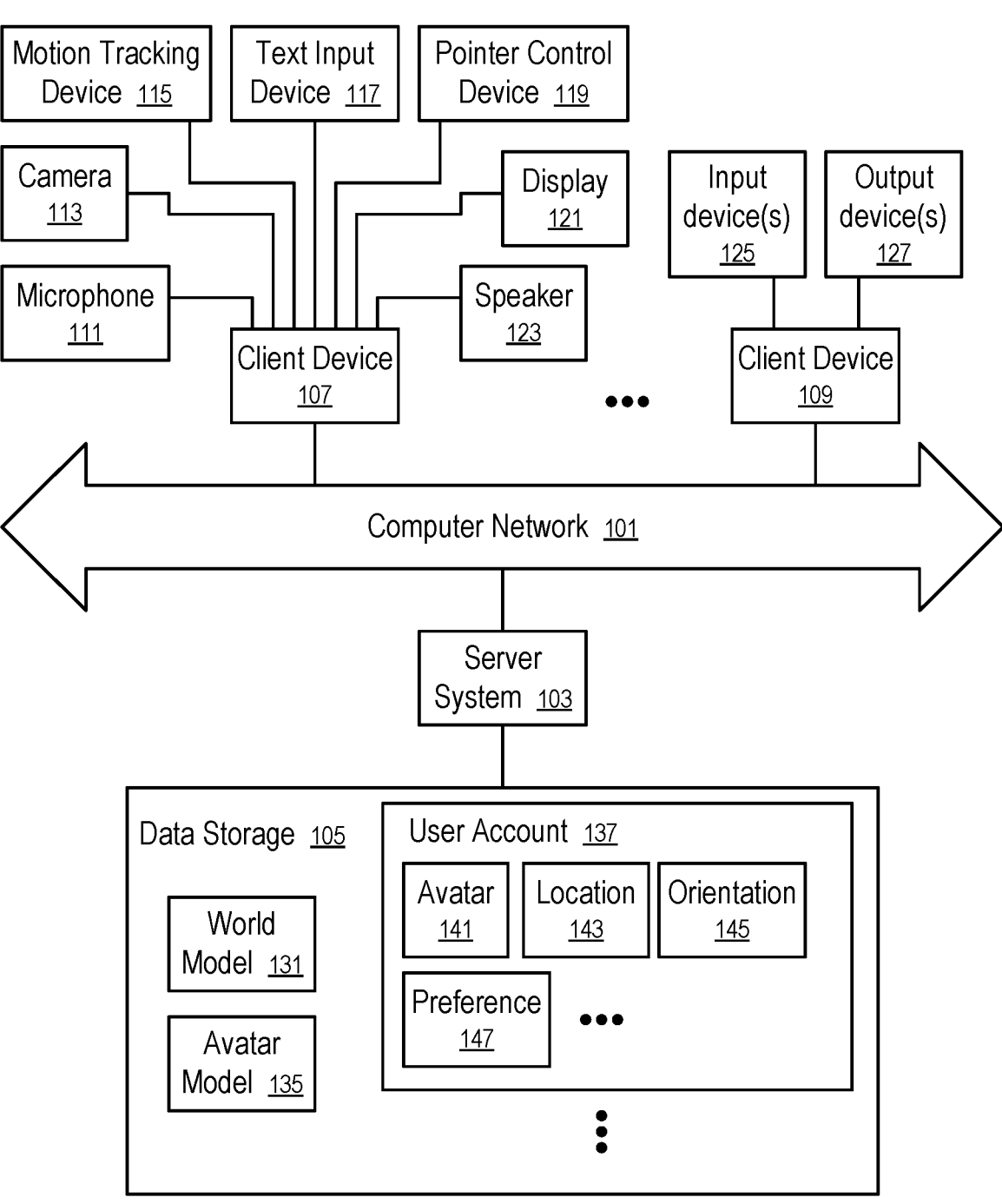
FIG. 1 shows a computer system in which techniques for the presentation of eye movement and eye contact can be used.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Eye contact is a form of communication of high value in social interactions. However, it is a challenge to present eye movement and eye contact in virtual reality where the users are represented by avatars, especially when the user device does not have an eye tracking capability.

The present disclosure provides solutions that present eye movement and eye contact in virtual reality using a computer-based eye movement model. The eye movement model controls the movement of an eye during a period of time according to a set of parameters of the model compute a computer animation of eye movements for an avatar in the virtual world. During the time period of animation, the computing process of the eye movements does not have to follow and/or be controlled by user inputs from a user input device, such as inputs from an eye tracking device. The parameters are programmed or animated to reflect typical patterns of eye movements during interactions among people in real world, such that the animated eye movements appear natural and improve social experiences in the virtual world. The animation parameters can be optimized via machine learning of eye tracking data of real time scenarios. Further, the animation parameters may be partially personalized to reflect the "personality" of the avatar, which may or may not resemble the personality of the actual user of the avatar in the real world. Preferably, the animation parameters are partially determined based on the context of the eye movements.

For example, the onset of the animated eye movements of an avatar in a virtual world may be triggered automatically by a specific context in the virtual world when the context meets a set of predetermined criteria. Alternatively, or in combination, the onset of the eye movement animation may be triggered for the avatar by an explicit input from the user of the avatar (e.g., through a predetermined key stroke on a keyboard, a set of key strokes on a keyboard, a voice command, a hand gesture made via a pointer control device, a head gesture made via a virtual reality headset, a gesture captured via the motion sensors of a mobile device).

For example, the duration of the eye movement animation can be computed for an avatar according to the context in the virtual world and/or the personalization parameters of the avatar. In a typical scenario, the eye movement animation moves the point of gaze of the avatar from an initial position to a position of interest (e.g., the eye or face of another avatar); and at the end of period, the point of gaze of the avatar returns to the initial point of gaze at the beginning of the animated period.

Optional user inputs can be used to terminate the animation before the expiration of the computed time period for the animation, or extend the time period in which the point of gaze is positioned at the point of interest. The eye movement animation represents a computer prediction of eye movements made based on available information in the virtual world; and user inputs can be used to train parameters of the eye movement model and/or personalize the model to increase the accuracy of predictions generated from the model.

For example, a period of eye movement animation can be triggered by real-time communications delivered by an avatar and/or real-time communications received in the avatar from other avatars. For example, when two avatars engage in a session of real-time communications (e.g., voice communications, instant messaging, text chat), the two avatars may have more frequent eye contacts than in other situations. Eye contacts may be triggered at a random time during the conversation and/or based on certain parameters of the conversation, such as a change in the tone in voice communications, the appearance of certain keywords, a change in topic, etc. Optionally, eye contacts can also be explicitly initiated by a user via an input from the user device (e.g., a predetermined key stroke on a keyboard, a set of key strokes on a keyboard, a voice command, a hand gesture made via a pointer control device, a head gesture made via a virtual reality headset, a gesture captured via the motion sensors of a mobile device).

A typical avatar in a three-dimensional virtual world has a position and orientation. A user device provides inputs to control the position and orientation of the avatar in the virtual world to simulate the experience of traveling in the virtual world by presenting the virtual world from the point of view of the position and orientation of the avatar. The virtual reality system (e.g., a server system and/or the client program/viewer) renders a view of the virtual world based on position and orientation of the avatar and presents the view of the virtual world on the user device.

Within the view of the virtual world, the virtual reality system may identify a set of objects or avatars that may be of particular interest to the avatar. For examples, when an avatar speaks to a nearby listening avatar, the listening avatar may become a point of interest for the gaze of the speaking avatar. For examples, when an avatar listens to a nearby speaking avatar, the speaking avatar may become a point of interest for the gaze of the listening avatar. For examples, when an avatar speaks to a group of avatars, the avatars in the group may become potential points of interest for the gaze of the speaking avatar. For example, when an avatar is being looked at in the eyes by a nearby avatar, the nearby avatar may become a point of interest for the gaze of the avatar being watched. When the virtual reality system predicts that an avatar has sufficient interest in a point, object, or avatar to move its gaze, the virtual reality system uses an eye movement model to perform or generate an animation of eye movement of the avatar. The eye movements are presented to other avatars to which the eyes of the avatar having the eye movements are visible. Optionally, the virtual reality system also changes the viewing orientation of the avatar having the eye movements to follow the animated eye direction of the avatar, as if the avatar had turned its head and/or moved towards the point of interest to obtain the view of the virtual world according to the animated move of the gaze of the avatar.

In some instances, the selection of the points, objects or avatars of interest as the targets of eye movement animations for an avatar may not be limited to the current view of the avatar in the virtual world. For example, the selection of the points, objects or avatars of interest can be made within a threshold from the current position of the avatar in the virtual world and an event that would call the attention of the avatar to the points, objects or avatars, such as when another avatar starts to talk even though the talking avatar is not currently in the field of view of the avatar for which an eye movement animation is triggered. When it is predicted that a typical person would turn around to take a look at the talking avatar briefly, the system may automatically initiate the animation to move the gaze. A sensitivity of such prediction can be controlled via weights applied according to the distance to the avatar, an angle to the current direction of the gaze of the avatar, and/or a personalization setting of the user of the avatar.

Optionally, during the eye movement animation, the virtual reality system switches the user input mode such that inputs from one or more input devices (e.g., from keyboard and/or mouse) that are used to control the position and orientation of the avatar before the animation is temporarily used during the animation to control the eye movements. Thus, a user can conveniently and/or intuitively provide inputs via the input devices to customize and/or correct the animation in real time and provide personalization training of the eye movement model. Such inputs from a group or category of users can also be used to train the eye movement model for the group or category of users.

In some instances, when the direction of the gaze is moved away significantly from an original direct, the system may further adjust the orientation of the avatar to keep a degree of consistency between the orientation of the avatar and the direction of the gaze of the avatar, without strictly assign the orientation of the avatar with the direction of the gaze of the avatar, such that there is an observable angle between the facial direction of the avatar and the direction of the gaze of the eye of the avatar. In some instances, the adjustment can be made via an animation of the head movements of the avatar relative to the body of the avatar to simulate the turning of the head of the avatar.

FIG. 1 shows a computer system in which techniques for the presentation of eye movement and eye contact can be used.

In FIG. 1, a server system (103) has a data storage (105) storing a three dimensional world model (131) and avatar models (135). The virtual world represented by the model (131) may or may not resemble a part of the real world on the Earth. Client devices (107, . . . , 109) can be used to access the virtual world via the server system (103). For example, the server system (103) may generate a view of the virtual world and provide the view to a client device (109) for display. For example, the server system (103) may extract a portion of the world model (131) and the avatar model (135) relevant for the display of the view for the client device (109); and the client device (109) constructs a view of the portion of the virtual world from the data extracted and provided by the server system (103).

In FIG. 1, a user of the server system (103) has a user account (137) stored in the data storage (105). The user account (137) hosts information such as the identification of an avatar (141) of the user in the virtual world, the location (143) and orientation (145) of the avatar (141) in the virtual world, preferences (147) of the user, such as the personalization parameters of the avatar (141).

After a user of a client device (109) is authenticated for the authorization to access the virtual world via the user account (137), the input devices (125) of the client device (109) provide user inputs to control the location (143) and orientation (145) of the avatar (141) of the user; and the server system (103) provides a data stream to the client device (109) according to the location (143) and the orientation (145) of the avatar (141) such that the client device (109) presents, on the output device (127), the view of the virtual world that is perceived to be seen in the eyes of the avatar (141). The view of the virtual world simulates the experience of a user in the virtual world at the location (143) and orientation (145) of the avatar (141); and the display of the virtual world on the client device (109) corresponds to the presentation of a video stream captured by a virtual camera at a location (143) and orientation (145) of the avatar (141). Since the view in the eyes of the avatar (141), the view generally does not include the avatar (141) itself and more specifically the eyes of the avatar (141). However, the avatar (141) itself and the eyes of the avatar (141) can be in the views of other avatars that are in the vicinity of the avatar (141).

Examples of the input devices (125) include a text input device (117) (such as a keyboard, a virtual keyboard implemented on a touch screen, text input implemented via speech recognition), a pointer control device (e.g., arrow keys of a keyboard, a mouse, a track ball, a touch pad, a touch screen, a joystick), a motion tracking device (e.g., motion sensors attached to a head-mount display, data glove, mobile phones, personal media player, mobile computing device, game controller), a digital camera (113), a microphone (111), etc.

Examples of the output devices (127) include a display (121) (e.g., a computer monitor, a touch screen, a head-mount display, a virtual reality headset) and a speaker (123) (or earphone, headphone.

In some instances, a client device (109) has an eye-tracking capability (e.g., via a head-mount camera (113) that capture video images of the eyes of the user, a front facing camera (113) of a smart phone, a tablet computer, a mobile device), which makes it possible to control the eye movements of an avatar (141) independent of the movement of the location (143) and orientation (141) of the avatar (141) as a whole.

However, when the client device (109) does not have an eye-tracking capability, a conventional virtual reality system does not display the eyes of avatar (141) with eye movements that are independent of avatar movements (or face movements of the avatar).

In FIG. 1, when the client device (109) does not have an eye-tracking capability, the system is configured to present eye movements based on predictions, eye movement models, preferences (147), and other inputs from other devices (e.g., 117, 119). For example, predetermined patterns of eye movements are animated based on predetermined models. Thus, the experiences of the user of the avatar (141) can be improved, as well as the experiences of other users interacting with the avatar (141) of the user in the virtual world.

The techniques of eye movements of the present application can also be used for the presentation of augmented reality, where virtual representations of users in the form of avatars are projected into a view of a real world. The avatars may have the form of a human and/or may be generated based on images of the users of the avatars so that the avatars resemble the users in real world.

FIG. 1 illustrates the use of a centralized server system (103) to host the virtual world represented by the world model (131). In other implementations, the virtual world may be hosted on a distributed computer network.

Figure 2:
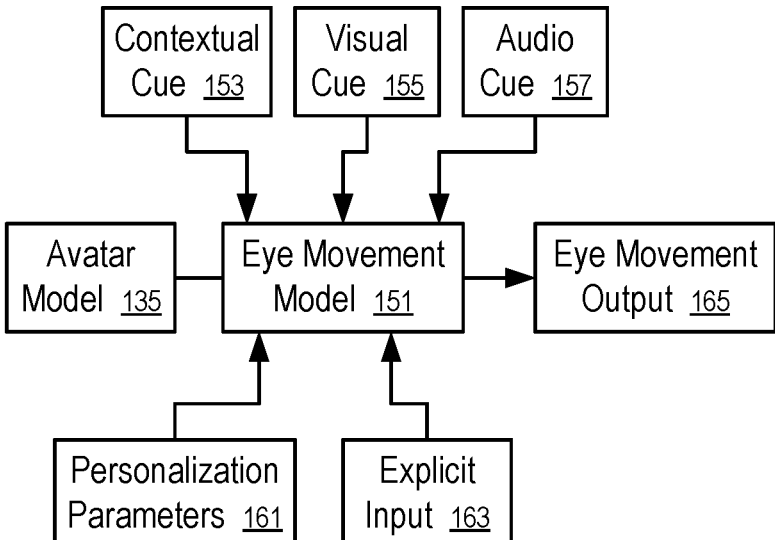
FIG. 2 illustrates the generation of eye movement outputs according to one embodiment.

FIG. 2 illustrates the generation of eye movement outputs according to one embodiment. For example, the techniques of FIG. 2 can be implemented in a system illustrated in FIG. 1.

In FIG. 2, an avatar model (135) includes an eye movement model (151) that characterizes the movements of an eye in a particular context (e.g., listening to a speech, engaging in a conversation, giving a speech, hearing a greeting or alert, etc.). The eye movements may include the shifting of the gaze of the eye from one object to another object of interest and, the shifting of the gaze of the eye from the object of interest back to the original object. The parameters of the eye movements may include the speed of the shift, the duration of the gaze staying at the object of interest, a pattern of limited movements while the gaze remains on the object of interest, etc.

In FIG. 2, the eye movement model (151) is used to generate an eye movement output (165) in the form of a computed eye orientations and/or positions relative to the face/body of the avatar (141). The eye movements change the rendering of the eyes of the avatar (141) relative to the face of the avatar (141) so that other avatars that can see the eyes moving in the face of the avatar (141). Optionally, the eye movements also change the viewing angle and/or focus of the avatar (141).

In FIG. 2, the use of the eye movement model (151) is based at least in part on a contextual cue (153), a visual cue (155) and/or an audio cue (157). The cues (153, 155, 157) can be used to select an eye movement model (151) from a plurality of models (151) that are appropriate for various situations and/or adjusts certain parameters of the eye movement model (151).

For example, a contextual cue (153) may indicate whether or not the avatar (141) is in a familiar environment, with a friend of the avatar, in an exploring mood, etc. The visual cue (155) identifies one or more objects or avatars that are currently in the field of view of the avatar (141) that may of potential interest to the avatar (141). The audio cue (157) identifies one or more objects or avatars that are currently communicating to the avatar (141) via real time communication connections, such as voice chat, instant message, text chat, private chat, public chat, etc.

For example, the cues (153, 155, 157) can be used to select a socially appropriate eye movement model (151), which model can be generated via machine learning of the eye movement patterns of real people interacting with each other (e.g., based on video images captured on videos of people engaging in interactions and/or via inputs from eye tracking devices used in accessing a virtual reality).

For example, the cues (153, 155, 157) can be used to customize one or more parameters of the eye movement model (151), such as the speed of gaze shifting, the duration of the gaze remaining at the object of interest, patterns of local movements of the gaze.

For example, the cues (153, 155, 157) can be used to trigger the use of the eye movement model (151), such as at a time when a conversation starts, at a time when certain keywords or combinations of keywords are detected, at a random time during a speech given by the avatar (141), at a time when an object or avatar unexpectedly enters the field of view of the avatar (141) (e.g., via teleporting).

In FIG. 2, the eye movement model (151) can be personalized with parameters (161) identified by the user of the avatar (141) as part of the preferences (147). The personalization parameters (161) adjust one or more parameters of the eye movement models (151) to provide personal characters of the avatar (141). The personalization parameters (161) can also be provided via machine learning of patterns from the explicit user input (163) received from the client device (109) to correct or modify the eye movement output (165) generated from the eye movement model (151), such that a need for explicit input (163) is reduced or eliminated. In some instances, the explicit user input (163) includes input generated by an eye-tracking device. In some instances, the personalization parameters (161) may include an attention span parameter derived from training data. The attention span can be used in the eye movement model (151) to compute the duration of the eye movement. Further, a user interface can be provided for the user to explicitly adjust the attention span parameter to customize the eye movement pattern of the avatar of the user. In some instances, a user may specify a list of friends (e.g., as part of the personalization parameters (161)); and the eye movement model (151) customize the eye movement animation based on the list of friends. For example, when a number of avatars are in communication with the avatar (141), the eye movement model (151) may give higher priority to those on the list of friends and lower priority to others that are not on the list; and the avatar (141) may have more frequent eye contacts with the friends than non-friends. Further, training data may further be used to score the levels of friendliness of the friends to customize the prioritization among the friends of the avatar (141).

The location (143) and orientation (145) of the avatar (141) in the virtual world can be controlled by the user input received from input devices (125) (e.g., text input device (117), pointer control device (119), motion tracking device (115) for tracking the motion of a hand or the head of the user). During the period of the animation of the eye movement output (165) the inputs generated by the input devices (125) can be temporarily re-mapped to control the eye movements, instead of the location (143) and orientation (145); and the user inputs (163) may be used to extend or shorten the duration during which the gaze of the eye of the avatar (141) is on the predicted object of interest (e.g., the eyes of a talking, nearby avatar), modify the pattern of gaze on a local area of the predicted object of interest (e.g., the face of the talking, nearby avatar), and/or select a different object of interest (e.g., the eyes of another nearby listening avatar). After the animation of the eye movement output (165) the inputs generated by the input devices (125) is again used to control the location (143) and orientation (145) of the avatar (141).

Figure 3:
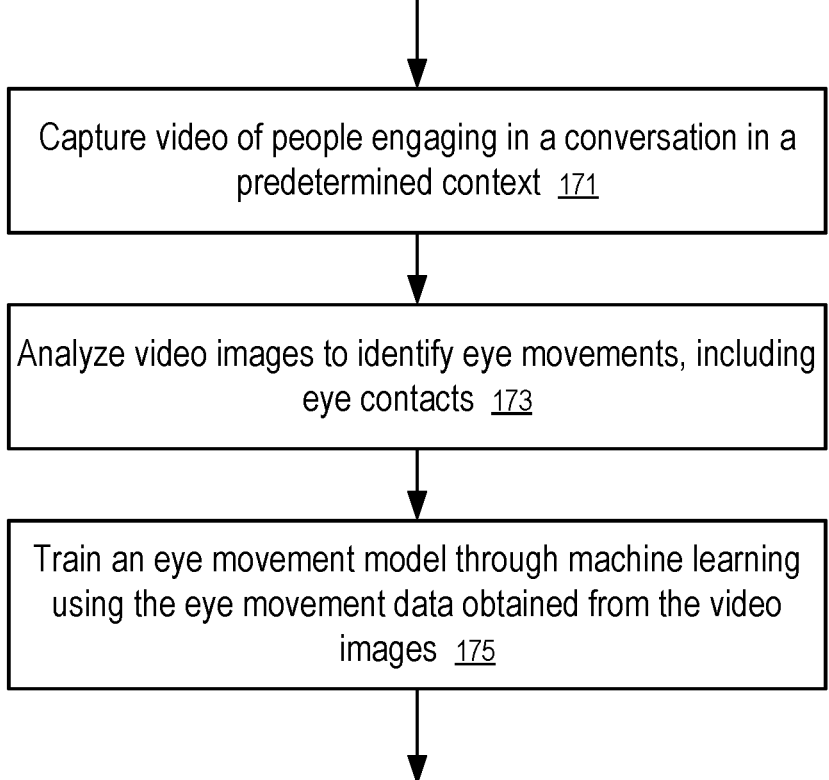
FIG. 3 shows a method to train an eye movement model for virtual reality.

FIG. 3 shows a method to train an eye movement model for virtual reality. For example, the method of FIG. 3 can be used to train the eye movement model (151) illustrated in FIG. 2, before the use of the eye movement model (151) in generating the eye movement output (165) (e.g., for the avatar (141) in FIG. 1).

The method of FIG. 3 includes: capturing (171) video of people engaging in a conversation in a predetermined context; analyzing (173) video images to identify eye movements, including eye contacts; and training (175) an eye movement model (151) through machine learning using the eye movement data obtained from the video images. The training of the eye movement model (151) using the method of FIG. 3 can be performed independent of the activities and behaviors in the virtual world hosted on the server system (103). The training made using the method of FIG. 3 establishes the baseline, socially familiar patterns of eye movements in various contexts and/or for peoples of different personalities.

FIG. 4 shows another method to train an eye movement model for virtual reality. For example, the method of FIG. 4 can be used to train the eye movement model (151) illustrated in FIG. 2, before the use of the eye movement model (151) in generating the eye movement output (165) (e.g., for the avatar (141) in FIG. 1). The method of FIG. 4 can be used to capture patterns of eye movements in various contexts and/or for peoples of different personalities in a virtual world environment (e.g., as hosted on the server system (103) of FIG. 1). The training using the method of FIG. 4 can be used to customize the eye movement model (151) previously trained using the method of FIG. 3, or used independent of the method of FIG. 3.

The method of FIG. 4 includes: receiving (181) inputs from an eye movement tracking device from a client device; controlling (183) eye movements of an avatar associated with the client device based the inputs; and training (185) an eye movement model (151) through machine learning using the inputs.

For example, when some client devices (e.g., 107) of the system illustrated in FIG. 1 have eye-tracking capabilities (e.g., using head-mount camera (113), or front facing camera (113) of mobile devices), the client devices (e.g., 107) can be further configured to extract eye movement data while the user interacting the virtual world hosted on the server system (103). The eye movement data can be optionally used to control the eye movements of the avatars (e.g., 141) in the virtual world. Using the eye-tracking data to train the eye movement model (151) can capture the behaviors and/or patterns of the eye movements which may or may not apparent in real world interactions among people.

FIG. 5 shows a method to generate visual outputs according to an eye movement model according one embodiment. For example, the method of FIG. 5 can be used to implement the techniques of FIG. 2, where the eye movement model (151) are trained using the method of FIG. 3 and/or the method of FIG. 4.

In FIG. 5, the method includes: detecting (191) a cue (e.g., 153, 155, or 157) that triggers an eye movement of a first avatar (141) that is in the view of one or more second avatars; controlling (193) eye movements of the first avatar according to a predetermined model (e.g., 151); presenting (195) the eye movements of the first avatar (141) to the one or more second avatars; and optionally adjusting (197) the view of the virtual world for the first avatar (141) according to the eye movements of the first avatar (141) computed as the eye movement output (165) from the model (e.g., 151).

Presenting the eye movements of the first avatar (141) to the one or more second avatars allows the users of the one or more second avatars to see the eye movements of the first avatar (141) relative to the face of the first avatar (141).

When the view of the virtual world for the first avatar (141) is adjusted according to the eye movements of the first avatar (141), the user of the first avatar (141) is provided with a predicted view of the virtual world that is more likely of interest to the user of the first avatar (141) for a moment. The prediction based control of the view of the virtual world provided to the first avatar (141) simplifies the user input to control the view of the virtual world and thus provides an improved user experience in the virtual world. The computer prediction and animation release the user of the avatar (141) from the burden of providing refined inputs to precisely control the location (143) and orientation (145) of the avatar (141) in order to obtain a view that the user is most likely interested to see.

Figure 6:
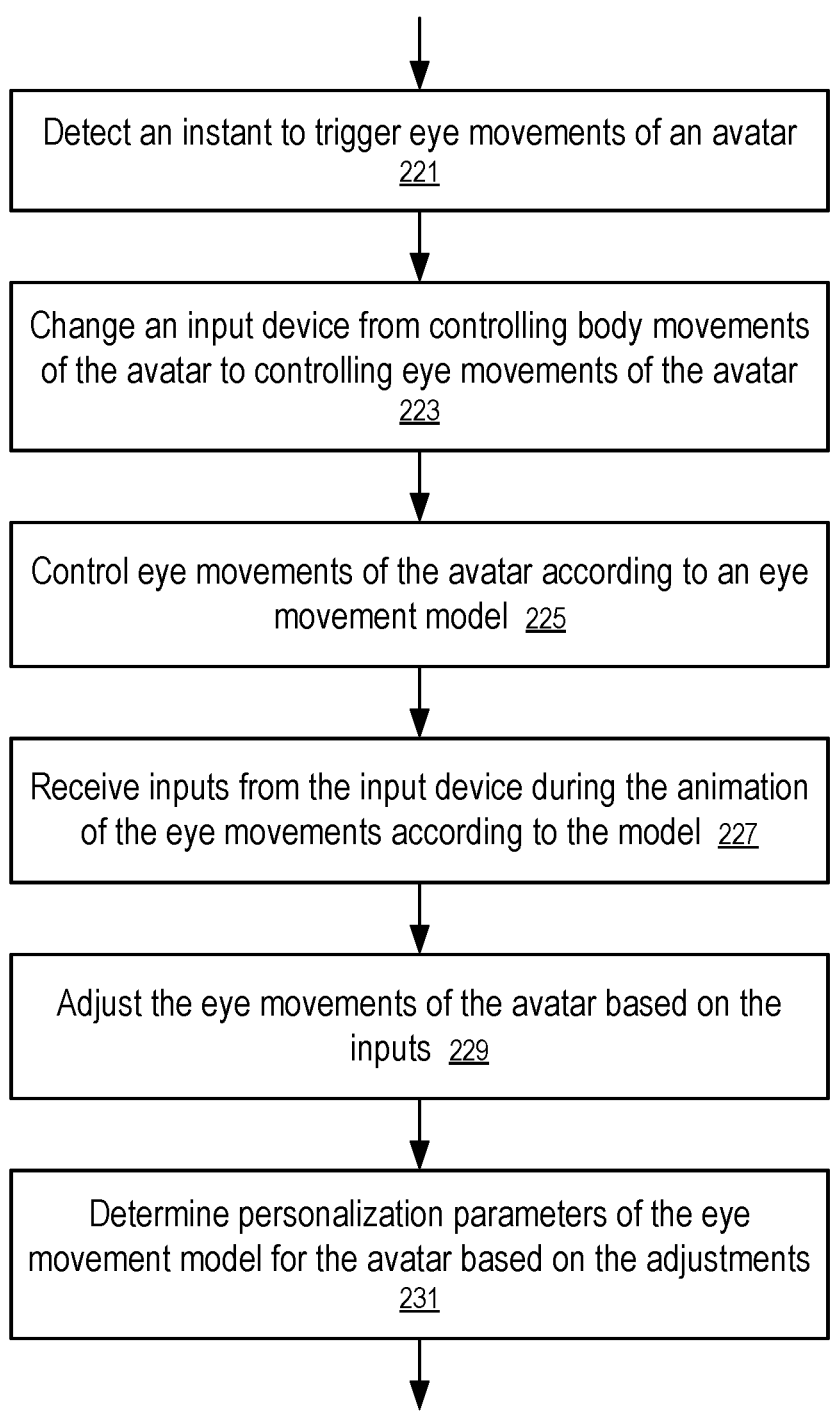
FIG. 6 shows a method to personalize an eye movement model according one embodiment.

FIG. 6 shows a method to personalize an eye movement model according one embodiment. For example, the method of FIG. 6 can be used to implement the techniques of FIG. 2 in the system of FIG. 1, where the eye movement model (151) is trained using the method of FIG. 3 and/or the method of FIG. 4.

The method of FIG. 6 includes: detecting (221) an instant to trigger eye movements of an avatar (141) (e.g., based on a contextual cue (153, a visual cue (156), an audio cue (157)); changing (223) an input device (125) from controlling body movements of the avatar (141) (e.g., the location (143) and orientation (145) of the avatar (141) as a whole) to controlling eye movements of the avatar (141) relative to the body of the avatar 9141) (e.g., the eye position and orientation relative to the face of the avatar (141)); controlling (225) eye movements of the avatar (141) according to an eye movement model (151); receiving (227) inputs (163) from the input device (125) during the animation of the eye movements according to the model (151); adjusting (229) the eye movements of the avatar (141) based on the inputs (163); and optionally determining (231) personalization parameters (161) of the eye movement model (151) for the avatar (141) based on the adjustments.

For example, the explicit inputs (163) received from the input device (125) can be used as training inputs for the derivation of the personalization parameters (161) using a machine learning technique. The personalization parameters (161) improve the accuracy of the prediction of the desired eye movement outputs (165) such that the need for future explicit input (163) can be reduced or eliminated.

Posture

In a typical virtual reality or augmented reality application, input devices of the users of the application capture input data to define the position and orientation of each avatar as a whole. However, the input device(s) of a user may not have sufficient capability to obtain input data to explicitly define the posture of the avatar of the user.

The techniques disclosed in the present application allow the prediction of the posture of a user of a virtual reality or augmented reality application based on limited device input and/or the context of the avatar in the application. A posture animation is generated based on the prediction to show the posture and/or posture changes of the avatar of the user in the virtual reality or augmented reality application.

In a typical application, the posture of the avatar of a user (and the avatar itself) is generally not visible to the user himself/herself. The posture of the avatar (and the avatar itself) is represented in the virtual/augmented reality application to other avatars/users that are in the vicinity of the avatar of the user in the virtual/augmented reality application. The presentation of the predicted posture of the avatar of the user enriches the virtual/augmented reality environment in which the avatar is located such that the avatar of the user appears more natural than a robotic presentation of its position and orientation. The presentation also improves communications via body languages in the form of postures.

In some instances, the system also provides a user interface to the user of the avatar to explicitly select (e.g., as a body language expression) a posture from a set of predefined postures and/or a sequence of postures. The user selection is used to generate a posture animation of the avatar corresponding to the selected posture or posture sequence. The user selection can be used to personalize a predictive model of avatar posture.

Figure 7:
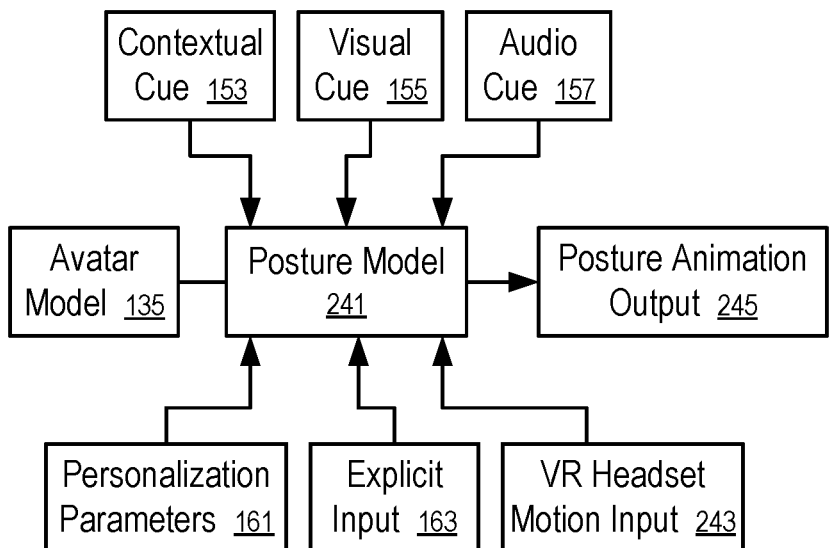
FIG. 7 shows a system to generate an animation of avatar posture according to one embodiment.

FIG. 7 shows a system to generate an animation of avatar posture according to one embodiment. For example, the techniques of FIG. 7 can be implemented in a system illustrated in FIG. 1 and/or in combination with the techniques of FIG. 2.

In FIG. 7, an avatar model (135) includes a posture model (241) that is configured to predict a posture (e.g., body configuration and/or its changes) of an avatar in a particular context (e.g., listening to a speech, engaging in a conversation, giving a speech, hearing a greeting or alert, etc.).

The posture may include the relative positions of various movable body parts of the avatar (e.g., limbs, torso) with respect to each other and/or their relative movements with respect to each other. The posture may be a still posture (e.g., standing still, sitting still), or a moving posture (e.g., walking, running), or a posture transition.

In FIG. 7, the posture model (241) is used to generate a posture animation output (245). For example, based on the contextual cue (153), visual cue (155), audio cue (157) and/or personalization parameters (161), the posture module (241) predicts a posture that specifies the relative positions of the body parts of the avatar and/or their patterns of movement with respective to each other. The animation for a specific posture may be partially or entirely created by an artist and/or customizable by computers according to one or more parameters. The posture parameters are applied to the avatar model (135) to generate a computer animation of the avatar showing the relative positions of the body parts of the avatar and/or their patterns of movement with respective to each other. Machine learning of the posture module (241) may include adjusting parameters that play pre-authored animations or transitions of posture in addition or in combination with direct inputs from the headset and other hardware inputs, such as inertial sensors, motion sensors and/or position sensors attached to the hands and/or feet of users.

Preferably, the prediction is based at least in part on the motion input (243) from a virtual reality headset worn by the user of the avatar. The patterns in the movement of the head of the user, as captured by the virtual reality headset as the motion input (243), are indicative of the posture of the user and/or posture transitions. Thus, the predictive capability of the posture model can be significantly improved with the motion input (243) from a virtual reality headset.

In some instances, certain patterns in the movement of the head of the user can be predefined as gestures for posture selection. The head gestures can be trained via machine learning to customize the posture model (241).

In some instances, other types of explicit input (163) can be generated via input devices other than a virtual reality headset. For example, hand gestures from game controllers may be used to explicitly select a posture from a set of predetermined postures. For example, a keyboard and/or a cursor control device (e.g., a mouse, a trackball, a touchpad, a touch screen, a joystick) can be used to select a posture from a set of predetermined postures (e.g., from a menu in a graphical user interface, or a short cut). In some instances, a voice command can be used to provide the explicit input (163).

In FIG. 7, the use of the posture movement model (241) is based at least in part on a contextual cue (153), a visual cue (155) and/or an audio cue (157). The cues (153, 155, 157) can be used to select a type of postures from a plurality of types of postures that are appropriate for various situations and/or adjust certain parameters of the posture model (241), such as the duration of the animation, the speed of certain movements involved in the posture or posture transition.

For example, a contextual cue (153) may indicate whether or not the avatar (141) is in a familiar environment, with a friend of the avatar, in an exploring mood, etc. The visual cue (155) identifies one or more objects or avatars that are currently in the field of view of the avatar (141) that may of potential interest to the avatar (141) to express certain altitude via posture changes in view of certain wordings in communications from or to the avatar. The audio cue (157) identifies one or more objects or avatars that are currently communicating to the avatar (141) via real time communication connections, such as voice chat, instant message, text chat, private chat, public chat, etc., which may trigger emotion changes and thus posture changes.

For example, the cues (153, 155, 157) can be used to select a socially appropriate posture model (241), which model can be generated via machine learning of the posture patterns of real people interacting with each other (e.g., based on video images captured on videos of people engaging in interactions in various context and/or via inputs from position/motion tracking devices used in accessing a virtual reality).

For example, the cues (153, 155, 157) can be used to customize one or more parameters of the posture model (241), such as the duration of the animation, the magnitude and/or patterns of movements of one or more body parts, the speed of the movements.

For example, the cues (153, 155, 157) can be used to trigger the use of the posture model (241), such as at a time when a conversation starts, at a time when certain keywords or combinations of keywords are detected, at a random time during a speech given by the avatar (141), at a time when an object or avatar unexpectedly enters the field of view of the avatar (141) (e.g., via teleporting).

In FIG. 7, the posture model (241) can be personalized with parameters (161) identified by the user of the avatar (141) as part of the preferences (147). The personalization parameters (161) adjust one or more parameters of the posture model (241) to provide personal characters of the avatar (141). For example, a user may select an "aggressive" type of posture, a "mild" type of posture, or a "friendly" type of posture, etc. The personalization parameters (161) can also be provided via machine learning of patterns from the explicit user input (163) received from the client device (109) to explicitly select a posture for the generation of the posture animation output (245) and/or the corresponding VR headset motion input (243), such that a need for explicit input (163) is reduced or eliminated. In some instances, the explicit input (163) is provided via a gesture input made using a VR headset.

In some instances, the explicit user input (163) includes position and motion inputs generated by tracking devices (e.g., having accelerometers and/or other types of position/motion sensors) attached to a user to capture the relative positions and motions of body parts of the user (e.g., feet, hand, arms, legs, torso). The explicit user input (163) of a subset of users of a virtual/augmented reality world (e.g., as testers, volunteers, or premium users) can be used to train the posture model to establish detailed posture patterns/parameter groups and improve posture prediction capability of the model (241).

In some instances, a user may specify a list of friends (e.g., as part of the personalization parameters (161)); and the posture model (241) customize the posture animation based on the list of friends. For example, when a number of avatars in the list of friends are in communication with the avatar (141), the posture model (241) may present more casual and/or friendly postures. Further, training data may further be used to score the levels of friendliness of the friends to customize the level of friendly or casual characteristics of the posture predicted for the context.

Figure 8:
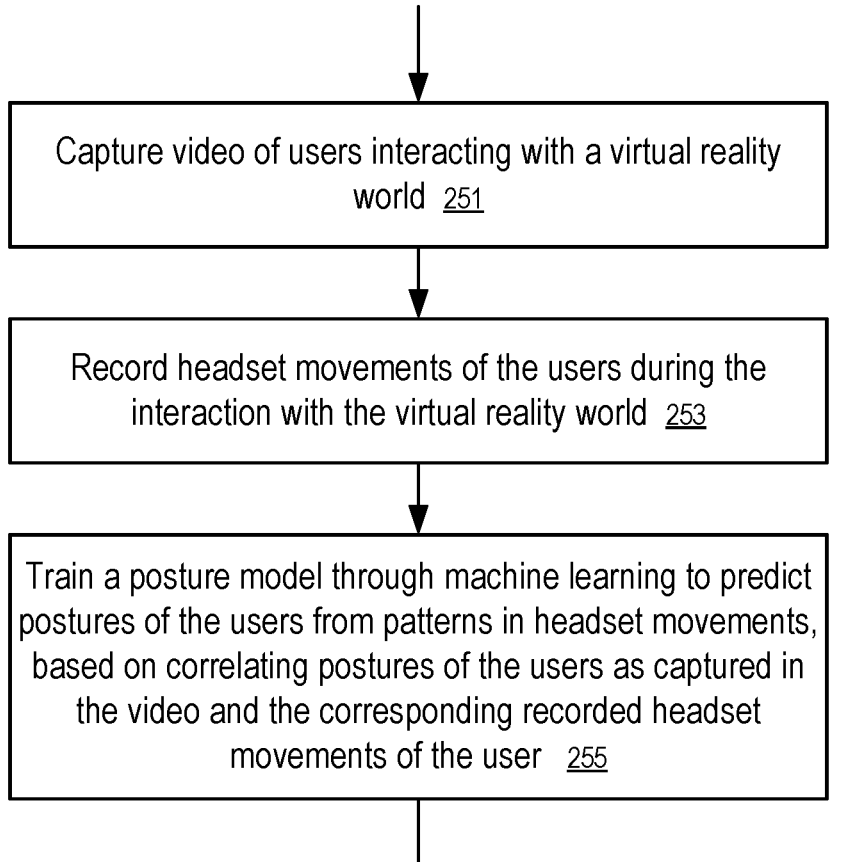
FIG. 8 shows a method to train a posture model for virtual reality.

FIG. 8 shows a method to train a posture model for virtual reality. For example, the method of FIG. 8 can be used to train the posture model (241) illustrated in FIG. 7, before the use of the posture model (241) in generating the posture animation output (245) (e.g., for the avatar (141) in FIG. 1).

The method of FIG. 8 includes: capturing (251) video of users interacting with a virtual reality world; recording (253) headset movements of the users during the interaction with the virtual reality world; and training (255) a posture model (241) through machine learning to predict postures of the users from patterns in headset movements, based on correlating postures of the users as captured in the video and the corresponding recorded headset movements of the user.

Figures 9, 10:
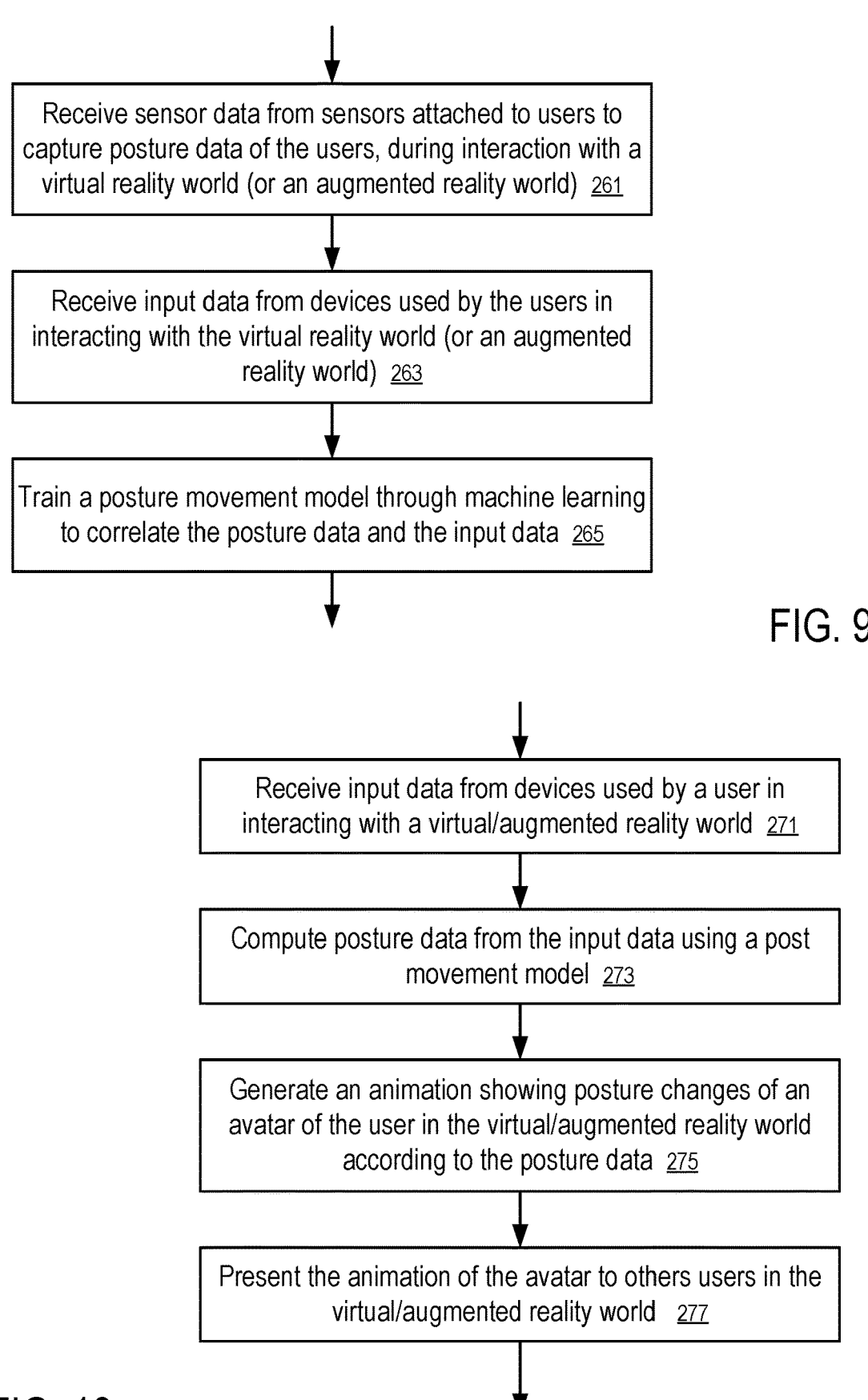
FIG. 9 shows another method to train a posture model for virtual reality.
FIG. 10 shows a method to generate a posture animation.

FIG. 9 shows another method to train a posture model for virtual reality. For example, the method of FIG. 9 can be used to train the posture model (241) illustrated in FIG. 7, before the use of the posture model (241) in generating the posture animation output (245) (e.g., for the avatar (141) in FIG. 1).

The method of FIG. 9 includes: during interaction with a virtual reality world (or an augmented reality world), receiving (261) sensor data from sensors attached to users to capture posture data of the users. Examples of the sensor data include the relative positions and orientation of body parts of a user and their relative movements.

The method of FIG. 9 further includes: during the interaction with the virtual reality world (or an augmented reality world), receiving (263) input data from devices used by the users in interacting with the virtual reality world (or an augmented reality world). The user input may include communications to other avatars/users, head movements to adjust the position and/or orientation of an avatar, and/or explicit user selections of postures, etc.

The method of FIG. 9 further includes training (265) a posture movement model (241) through machine learning to correlate the posture data and the input data.

In some instances, the methods of FIG. 8 and FIG. 9 can be combined. For example, the posture data can be captured via videos of some users and the sensor data from other users. For example, posture data of some testers may be captured via both videos and motion sensor data. For example, the posture model (241) can be initially trained using one of the methods of FIGS. 8 and 9 and then further trained using another of the methods.

FIG. 10 shows a method to generate a posture animation. For example, the method of FIG. 10 can be used to implement the techniques of FIG. 7, where the posture model (241) is trained using the method of FIG. 8 and/or the method of FIG. 9.

In FIG. 10, the method includes: receiving (271) input data from devices used by a user in interacting with a virtual/augmented reality world. The input data collected in FIG. 10 is similar to the input data collected in the training method of FIG. 9, such as communications to other avatars/users, head movements to adjust the position and/or orientation of an avatar, and/or explicit user selections of postures, etc.

In FIG. 10, the method computes (273) posture data from the input data using a post movement model (241). The posture data identifies the relative positions of body parts of the avatar of the user and/or their patterns of movements.

In FIG. 10, the method further includes: generating (275) an animation showing posture changes of the avatar of the user in the virtual/augmented reality world according to the posture data. In the animation, the body parts of the avatar are shown to move to the relative positions specified in the posture data and/or the patterns of movements.

In FIG. 10, the method presents (277) the animation of the avatar to other users/avatars in the virtual/augmented reality world.

FIG. 11 shows a method to present an avatar with posture animation in a virtual/augmented reality. For example, the method of FIG. 11 can be used to implement the techniques of FIG. 7 in the system of FIG. 1, where the posture model (241) is trained using the method of FIG. 8 and/or the method of FIG. 9.

The method of FIG. 11 includes: identifying (281) a context of an avatar (141) in a virtual/augmented reality (e.g., implemented in a system as illustrated in FIG. 1); receiving (283) motion data (e.g., from a VR headset) identifying the orientation of the head of a user of the avatar (141) and a movement pattern of the head of the user; controlling (285) head movements of the avatar (141) (and/or the position and orientation of the avatar (141)) according to the motion data; computing (287) posture data from a posture model (241) based on the motion data; generating (289) posture animation of the avatar (141) according to the posture data; and presenting (291) the avatar (141) in the virtual/augmented reality according to the posture animation.

For example, a computing system (e.g., as illustrated in FIG. 1) can implement a three-dimensional virtual reality world using a server system (103); and a data storage device (105) storing: a three-dimensional model (131) of the virtual reality world; and avatar models (e.g., 135) representing residences of the virtual reality world. The server system (105) generates, from the three-dimensional model (131) of the virtual reality world and the avatar models (e.g., 135), data stream to provide views of the virtual reality world to client devices (107, . . . , 109) that are connected to the server system (103) via a computer network (101). The computing system tracks a position and orientation of each respective avatar (141) in the virtual reality world, presents the avatar (141) according to the position and orientation in the virtual reality world to other avatars (and thus their users), and presents the view of the virtual world as seen by the avatar (141) at its position and orientation to the user of the avatar (141).

In the computing system (e.g., as illustrated in FIG. 1), a computer implemented method includes: receiving, in the server system (103) from a user device (e.g., 107 or 109), input data tracking a position, orientation, and motions of a head of a user of the virtual reality world; predicting, according to a posture model (241) and from the input data, a posture of an avatar (141) that represents the user in the virtual reality world; and computing an animation of the avatar (141) showing the posture of the avatar (141) in the virtual reality world.

The posture may identify a position change or movement of a body part (e.g., a limb or torso) of the avatar relative to a head of the avatar; and the prediction is made without an input device sensing a position or movement of a portion of the user corresponding to the body part of the avatar.

Typically, the avatar (141) is presented in the virtual reality world to second avatars in the virtual reality world; and the posture of the avatar (141) is not presented to the user in the virtual reality world. Thus, the animation of the posture of the avatar (141) does not have any direct impact on the experience of the user of the avatar (141). However, the posture animation of the avatar (141) enriches the experiences of other avatar users that have visibility to the avatar (141). Similarly, the posture animation of other avatars within the view of the avatar (141) enriches the experiences of the user of the avatar (141).

The posture can be predicted based at least in part on a context of the avatar (141) in the virtual reality world and/or based on personalization parameters of the avatar.

For example, the input data, generated by a virtual reality (VR) headset and used for the prediction of the posture, can be used to directly control the orientation and position of the avatar.

In some instances, the computing system identifies a pattern of head motion of the user from the input data generated by the VR headset, and makes the prediction in response to a detection of the pattern in the input data. The pattern may represent a head gesture of the user; and the computing system may further determine personalization parameters (161) of the posture model (241) based on the head gesture (e.g., using a machine learning technique).

The posture model used to make the prediction can be trained via machine learning using postures captured in video images of people engaging in social activities and/or using body movements tracked using position and motion tracking devices attached to a portion of users of the virtual reality world.

Using the predictive posture model, the posture animation output (245) can be computed without input from a client device tracking relative positions or movements of portions of the user that corresponding to the relative positions or movements of corresponding portions of the avatar having the posture.

Figure 12:
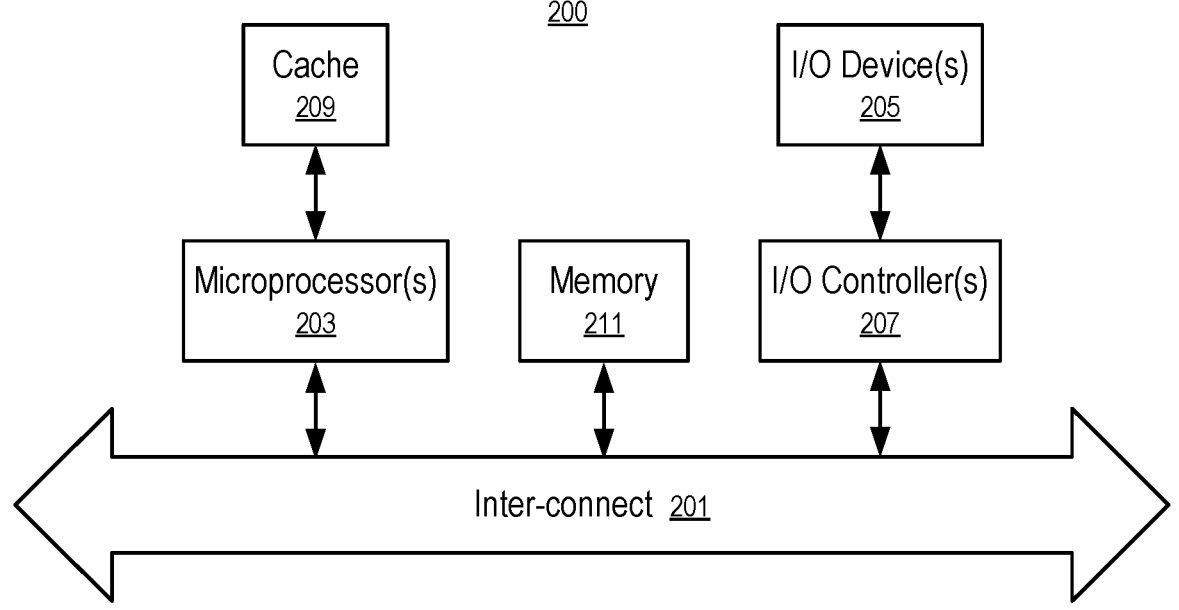
FIG. 12 shows a data processing system on which the methods of the present disclosure can be implemented.

Each of the client devices (107, . . . , 109) and the server system (103) can be implemented in the form of one or more data processing systems illustrated in FIG. 12, with more or fewer components.

The present disclosure includes the methods discussed above, computing apparatuses configured to perform methods, and computer storage media storing instructions which when executed on the computing apparatuses causes the computing apparatuses to perform the methods.

FIG. 12 shows a data processing system on which the methods of the present disclosure can be implemented. While FIG. 12 illustrates various components of a computer system, it is not intended to represent any particular architecture or manner of interconnecting the components. Other systems that have fewer or more components than those shown in FIG. 12 can also be used.

In FIG. 12, the data processing system (200) includes an inter-connect (201) (e.g., bus and system core logic), which interconnects a microprocessor(s) (203) and memory (211). The microprocessor (203) is coupled to cache memory (209) in the example of FIG. 12.

In FIG. 12, the inter-connect (201) interconnects the microprocessor(s) (203) and the memory (211) together and also interconnects them to input/output (I/O) device(s) (205) via I/O controller(s) (207). I/O devices (205) may include a display device and/or peripheral devices, such as mice, keyboards, modems, network interfaces, printers, scanners, video cameras and other devices known in the art. When the data processing system is a server system, some of the I/O devices (205), such as printers, scanners, mice, and/or keyboards, are optional.

The inter-connect (201) includes one or more buses connected to one another through various bridges, controllers and/or adapters. For example, the I/O controllers (207) include a USB (Universal Serial Bus) adapter for controlling USB peripherals, and/or an IEEE-1394 bus adapter for controlling IEEE-1394 peripherals.

The memory (211) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

OTHER ASPECTS

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/ or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computing system, comprising:
a server system;
wherein the server system is configured to:
    generate data stream to client devices that are connected to the server system via a computer network, the data stream providing views of a virtual reality world;

receive, from a client device, input data tracking position of a user of the client device, wherein the input data is generated by a virtual reality (VR) headset;
    present, based on the input data tracking position, a body posture of an avatar in the virtual reality world, wherein the body posture is predicted without the client device tracking relative positions or movements of portions of the user that represent a body posture of the user;
    identifying a pattern of head motion of the user from the input data generated by the VR headset, wherein the prediction is based on a detection of the pattern;
    wherein the presented body posture of the avatar is presented via an animation of the avatar;
    wherein the predicted body posture of the avatar identifies a position change or movement of a body part of the avatar relative to a head of the avatar.

2. The computing system of claim 1, wherein the body posture is predicted further based at least in part on a context of the avatar in the virtual reality world.

3. The computing system of claim 2, wherein the body posture is predicted further based on personalization parameters of the avatar.

4. A method, comprising:
generating data stream to client devices that are connected to the server system via a computer network, the data stream providing views of the virtual reality world;
receiving, from a client device, input data tracking position of a user of the client device, wherein the input data is generated by a virtual reality (VR) headset;
presenting, based on the input data tracking position, a body posture of an avatar of the user in the virtual reality world;
identifying a pattern of head motion of the user from the input data generated by the VR headset, wherein the prediction is based on a detection of the pattern;
wherein the body posture is predicted without an input device sensing a position or movement of a body of the user.

5. The method of claim 4, wherein the body of the user includes a limb or torso of the user.

6. The method of claim 5, wherein the avatar is presented in the virtual reality world to second avatars in the virtual reality world.

7. The method of claim 6, wherein the body posture of the avatar is not presented to the user in the virtual reality world.

8. The method of claim 7, further comprising:
controlling an orientation and position of the avatar based on the input data.

9. A non-transitory computer storage medium storing instructions configured to instruct a computer system to perform a method, the method comprising:
generating data stream to client devices that are connected to the server system via a computer network, the data stream providing views of the virtual reality world;
receiving, from a client device, input data tracking position of a user of the client device, wherein the input data is generated by a virtual reality (VR) headset;
presenting, based on the input data tracking position, a body posture of an avatar of the user in the virtual reality world;
identifying a pattern of head motion of the user from the input data generated by the VR headset, wherein the prediction is based on a detection of the pattern;
wherein the body posture is predicted without an input device sensing a position or movement of a body of the user.

10. The non-transitory computer storage medium of claim 9, wherein the pattern represents a head gesture of the user.

11. The non-transitory computer storage medium of claim 10, wherein the method further comprises:

determining personalization parameters of a posture model corresponding to the head gesture using a machine learning technique.

12. The non-transitory computer storage medium of claim 11, wherein the posture model is trained at least via machine learning using postures captured in video images of people engaging in social activities.

13. The non-transitory computer storage medium of claim 11, wherein the posture model is trained at least via machine learning using body movements tracked using position and motion tracking devices attached to a portion of users of the virtual reality world.

* * * * *